United States Patent [19]

Idogaki et al.

[11] Patent Number: 4,647,009
[45] Date of Patent: Mar. 3, 1987

[54] ELECTROMAGNETIC ROTARY DRIVING DEVICE

[75] Inventors: Takaharu Idogaki, Okazaki; Hisasi Kawai, Toyohashi; Kyo Hattori, Susono; Kazuhiro Sakurai, Gotenba, all of Japan

[73] Assignees: Nippon Soken, Inc., Nishio; Toyota Jidosha Kabushiki Kaisha, Toyota, both of Japan

[21] Appl. No.: 807,110

[22] Filed: Dec. 10, 1985

Related U.S. Application Data

[63] Continuation of Ser. No. 499,402, May 31, 1983, abandoned.

[30] Foreign Application Priority Data

Jun. 1, 1982 [JP] Japan .................. 57-092114

[51] Int. Cl.[4] .............................................. F16K 31/02
[52] U.S. Cl. ......................... 251/129.12; 251/129.05; 335/230; 335/272
[58] Field of Search ................ 251/129.01, 129.11, 251/129.12, 129.05, 65, 129.08; 310/49 R, 152; 335/272, 230; 361/152-154, 208

[56] References Cited

U.S. PATENT DOCUMENTS

| 1,302,284 | 4/1919 | Beall | 335/272 |
|---|---|---|---|
| 2,324,200 | 7/1943 | Dodd | 361/208 |
| 2,781,779 | 2/1957 | Kindl . | |
| 2,989,668 | 6/1961 | Parisoe | 335/272 |
| 3,214,662 | 10/1965 | Wolf | 310/152 |
| 3,323,548 | 6/1967 | Ludwig . | |
| 3,329,916 | 7/1967 | Carson | 335/230 |
| 3,330,997 | 7/1967 | Keprta | 361/153 |
| 3,402,309 | 9/1968 | Greenberg | 335/272 |
| 3,434,082 | 3/1969 | Montagu . | |
| 3,694,782 | 9/1972 | Ray . | |
| 3,745,420 | 7/1973 | Hafner | 361/203 |
| 3,862,739 | 1/1975 | Fujiwara | 251/134 |
| 3,870,931 | 3/1975 | Myers | 361/210 |
| 3,982,505 | 9/1976 | Rivere | 361/154 |
| 4,135,138 | 1/1979 | McClintock | 335/272 |
| 4,157,521 | 6/1979 | Leland | 335/272 |
| 4,345,737 | 8/1982 | Kawai et al. . | |
| 4,398,107 | 8/1983 | Fukushima | 310/49 R |
| 4,546,338 | 10/1985 | Idogaki et al. | 251/129.12 |

FOREIGN PATENT DOCUMENTS 57-9379 1/1982 Japan .
852714 10/1960 United Kingdom .

Primary Examiner—Margaret A. Focarino
Assistant Examiner—Noah Kamen
Attorney, Agent, or Firm—Cushman, Darby & Cushman

[57] ABSTRACT

An electromagnetic rotary driving device including a rotor of a permanent magnet arranged in a hole formed in a bored stator core block of a stator core, made from magnetic material. The air gap formed between the bored block of the stator core and the rotor in the direction parallel with the magnetic path in the stator core is relatively long, while the air gap formed between the bored block of the stator core and the rotor in the direction perpendicular to the magnetic path in the stator core is relatively short. In this device, the angle of rotation of the rotor is continuously changed by the current flowing through the coil of the stator without requiring a spring for return motion.

7 Claims, 17 Drawing Figures

ELECTROMAGNETIC ROTARY DRIVING DEVICE

This is a continuation of application Ser. No. 499,402, filed May 31, 1983, which was abandoned upon the filing hereof.

BACKGROUND OF THE INVENTION

1. Field of the Invention

The present invention relates to an electromagnetic rotary driving device which is suitably adapted as a rotary driving device for an air flow rate control device of an exhaust gas control apparatus for an automobile.

2. Description of the Prior Art

In a conventional proportional solenoid, such as that used for various types of devices as shown in FIG. 1, a cylindrical coil 101 is arranged inside a cylindrical case 100. A core 102 is disposed at the center of the coil 101. A plunger 103 is arranged to define a predetermined air gap 104 between itself and the core 102, thereby constituting a movable section. An oil-impregnated plastic member 105 is arranged at the center of the core 102 and supports the plunger 103. The proportional solenoid has an air passage 106 and is used for controlling the flow rate of air.

In the device shown in FIG. 1, the plunger 103 can only have a stroke of about 5 mm. When the device is used, for example, in an exhaust gas control apparatus for an automobile or the like, the device is required to control the flow rate in the range of 0 to 600 l/min. For this purpose, the air passage 106 must have a diameter of 14 mm or more, resulting in a very large device. Furthermore, since the air gap 104 is opened or closed by the linear movement of the plunger 103, the device is subject to the problem of vibration.

SUMMARY OF THE INVENTION

It is the object of the present invention to provide an electromagnetic rotary driving device wherein a through hole is formed in part of a stator core defining a closed magnetic path, a rotary magnet is inserted in the through hole, a gap between the stator core and the rotary magnet is properly selected, and the ratio of the periods of the positive and negative polarities of the current to be supplied to a stator coil wound around the stator core may be varied, so that an angle of rotation of the rotary magnet is continuously changed by the current flowing through the coil without requiring a spring for return motion.

According to the present invention, there is provided an electromagnetic rotary driving device comprising: a stator core made of magnetic material consisting of a plurality of stator core blocks, one of the stator core blocks being bored to form a hole; a stator coil wound around one of the stator core blocks; a rotor of a permanent magnet arranged in the hole of the bored stator core block; and a rotatable shaft fixed to the rotor adapted to transmit the rotational action of the rotor to a load coupled to the rotatable shaft. The length of air gap formed between the bored block of the stator core and the rotor in the direction parallel with the magnetic path in the stator core is relatively large, while the length of the air gap formed between the bored block of the stator core and the rotor in the direction perpendicular to the magnetic path in the stator core is relatively small. The width of the magnetic material of a portion of the bored block of the stator core is restricted so that the cross-sectional area of the portion is restricted.

DESCRIPTION OF THE PREFERRED EMBODIMENTS

Figure 1:
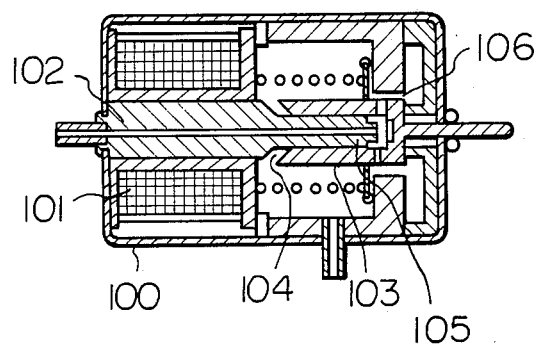
FIG. 1 is a cross-sectional view of the structure of a conventional proportional solenoid.
Figure 3:
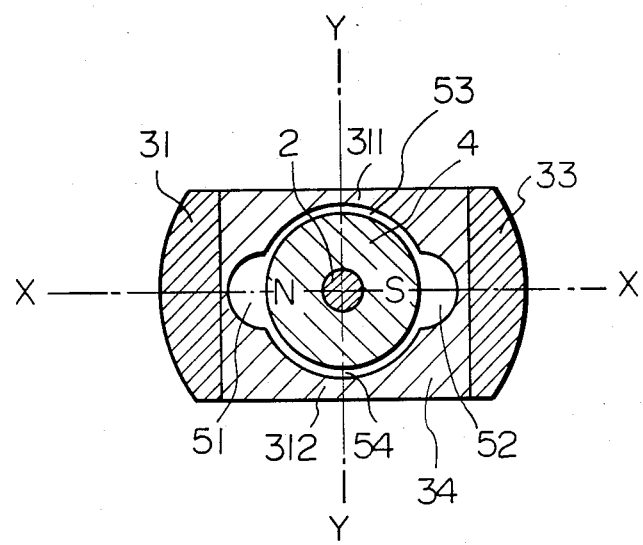
FIG. 3 is a cross-sectional view of the device shown in FIG. 2 along the line III—III.
Figure 2:
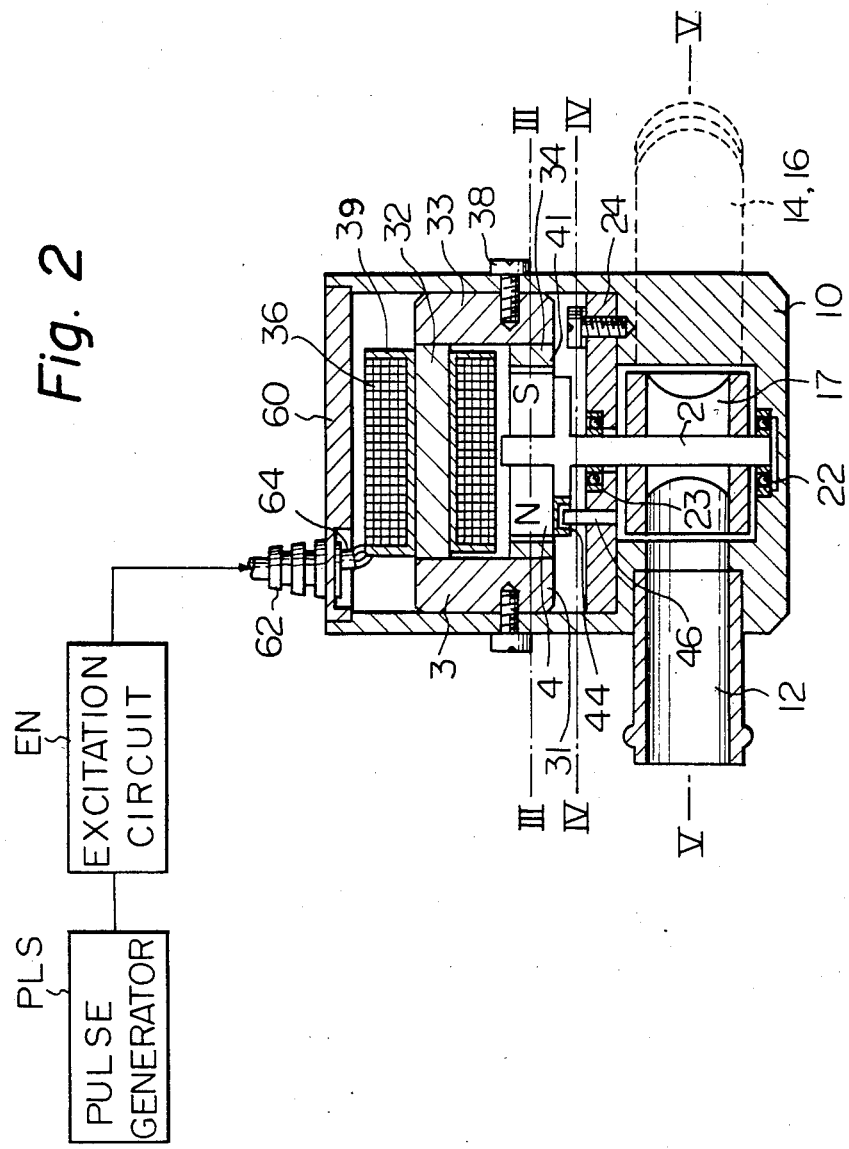
FIG. 2 is a longitudinal cross-sectional view of a rotary driving device according to an embodiment of the present invention.
Figure 4:
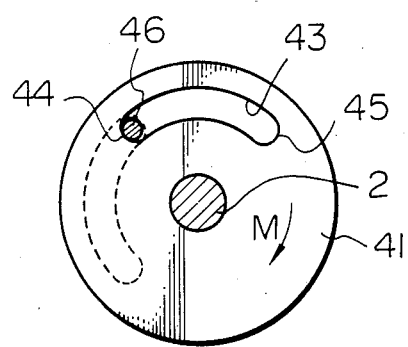
FIG. 4 is a cross-sectional view of the device shown in FIG. 2 along the line IV—IV.

FIG. 2 shows an electromagnetic rotary driving device according to an embodiment of the present invention. In FIG. 3 shows a cross-section of the device along the line III—III FIG. 2, and in FIG. 4 shows a cross-section along the line IV—IV in FIG. 2. The device shown in FIG. 2 is a proportional solenoid having a three-way structure for controlling the flow rate of air. Referring to FIG. 2, the first to third pipes 12, 14, and 16 are mounted on a valve housing 10. A valve rotor 17 is positioned inside the valve housing 10. A valve shaft 2 extends along the central axis of the valve rotor 17. One end of the valve shaft 2 is pivotally supported on the valve housing 10 through a ball bearing 22, while the other end is pivotally supported on a valve cover 24 by a ball bearing 23.

Figure 5:
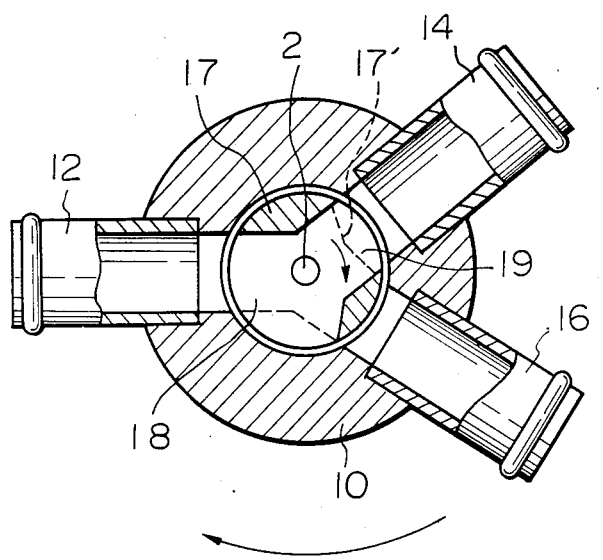
FIG. 5 is a cross-sectional view of the device shown in FIG. 2 along the line V—V.

The valve rotor 17 has a sector-shaped inlet port 18 and a straight outlet port 19 which communicate with each other, as shown in FIG. 5. When the valve rotor 17 is at the position indicated by the solid line in FIG. 5, the first pipe 12 communicates with the second pipe 14. When the valve rotor 17 is rotated in the direction indicated by the arrow, the first pipe 12 communicates with the third pipe 16 as indicated by the dotted line.

Thus, when the valve rotor 17 is at the position indicated by the solid line, the second pipe 14 is fully open and the third pipe 16 is fully closed. On the other hand, when the valve rotor 17 is at the position indicated by the dotted line, the second pipe 14 is fully closed and the third pipe 16 is fully open. The valve rotor 17 is thus controlled to lie between the positions indicated by the solid and dotted lines.

A stator core 3 is mounted inside the valve housing 10 by means of screws 38 (see FIG. 2). A spool 39 is inserted in the stator core 3 and an excitation coil 36 is wound therearound. The stator core 3 is divided into blocks 31 to 34, which are respectively positioned by means of knock pins. A through hole is formed in the block 34. The stator core 3 forms a closed magnetic path. A rare-earth element rotary magnet 4 such as a cerium-cobalt-type rotary magnet is arranged in the through hole formed in the block 34. The rotary magnet 4 is placed on and adhered with an adhesive to a plate 41 which is formed integrally with the valve shaft 2.

An arcuated slot 43 is formed in the plate 41 spanning an angle of less than 180° with respect to the center of the plate 41 and receives the upper end of a stopper pin 46 (see FIG. 4). The lower end of the stopper pin 46 is pressed into the valve cover 24. The valve shaft 2 and hence the valve rotor 17 are thus rotatable between a first positon (solid line) where the stopper pin 46 abuts against one end 44 of the arcuated slot 43 and a second position (broken line) where the stopper pin 46 abuts against the other end 45 of the slot 43.

In the final assembly step, an end plate 60 is pressed into the valve housing 10. The end plate 60 has a rubber grommet 62 through which extends a lead wire 64 to the winding end of the coil 36. The lead wire 64 receives an output signal from a coil excitation circuit EN which, in turn, receives an output pulse from a pulse generator PLS. One of the diametrically opposing ends of the rotary magnet 4 is magnetized to the north pole, while the other is magnetized to the south pole.

The size of magnetic gap portions 51 and 52 (see FIG. 3) formed between the rotary magnet 4 and the stator core 3 along the X-axis, which lies parallel to the magnetic path of the stator core 3 and passes through the center of the rotary magnet 4, is larger than that of gap portions 53 and 54 along the Y-axis, which lies perpendicular to the magnetic path of the stator core 3 and passes through the center of the rotary magnet 4. Portions 311 and 312 of the stator core 3 corresponding to the gap portions 53 and 54 are restricted in their width so as to shield the lines of magnetic force.

Figure 8:
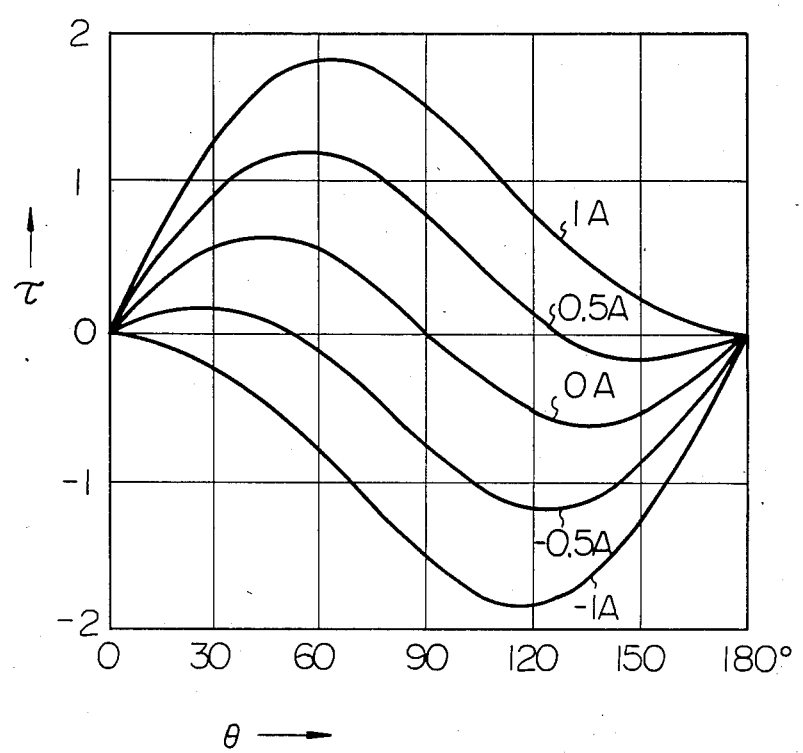
FIG. 8 is a graph of the relationship between the angle of rotation and the torque.
Figure 10:
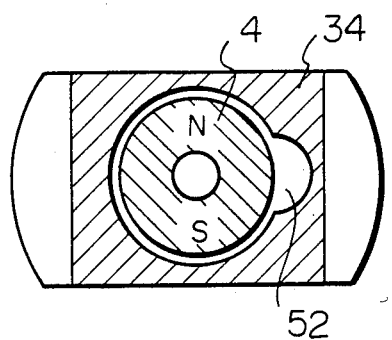

FIG. 8 shows the relationship between the angle of rotation $\theta$ or rotation angle and the torque $\tau$ using the current flowing to the coil 36 as a parameter. The angle of rotation $\theta$ of the rotary magnet 4 is plotted along the axis of abscissa; the angle of rotation $\theta$ increases from 0° as the rotary magnet 4 rotates clockwise from the position where the S and N poles lie on the X-axis. The torque obtained when no current is supplied to the coil 36 is defined as the detent torque.

Since the gap sizes at these portions 53 and 54 are smaller than that at those portions 51 and 52 as described above, when no current is supplied to the coil 36 or when a duty ratio of the bidirectional current to the coil 36 is 50%, the magnetic flux of the permanent magnet 4 biases the same to such a position where the south and north poles thereof face the portions 311 and 312. This position is referred to as a stable position of the rotary magnet.

There are two stable positions in this arrangement, when the slot 43 and the stopper pin 46 are not provided, namely, one of the stable positions is where the north pole faces the portion 311, the rotation angle at this position being 90°, while the other stable position is where the north pole faces the portion 312. The rotation angle at this position is −90°.

However, since the rotational angle of the rotary magnet 4 is restricted by means of the slot 43 and the stopper pin 46, the first-mentioned position, wherein the rotational angle is 90°, is the sole stable position in this embodiment.

The sectional areas of the portions 311 and 312 are made smaller so that the magnetic reluctance thereat is increased. Therefore, when the current is supplied to the coil 36 to generate magnetic flux, some of the flux can not flow through these portions 311 and 312 and thereby they are forcedly passed through the rotary magnet 4, which causes the rotary magnet 4 to rotate depending on the magnitude of the magnetic flux generated by the coil 36.

A torque, which causes the rotary magnet 4 to rotate in either a clockwise or a counterclockwise direction, is given by the magnetic flux generated at the coil 36, as above. The torque changes dependent on the amount of current or a duty ratio of the bidirectional current flowing through the coil 36, as shown in FIG. 8. The valve rotor 17 is rotated to and held at an angular position where the torque becomes zero. For example, when an amount of current is 0.5 A or when a duty ratio is 75%, the rotational angle of the rotor valve is about 130°.

It should be noted here that there are three angular positions where the torque becomes zero in the above example, namely at 0°, 130° and 180°. However, the rotary magnet 4 is stably held only at the angular position where not only is the torque zero but where the torque traverses this zero point from the positive to the negative sides as the rotational angle increases.

When the negative-going slope of the torque is gradual, in the graph shown in FIG. 8, the force acting to stabilize the magnet at a predetermined position is decreased and the position of the magnet becomes unstable.

Figure 6:
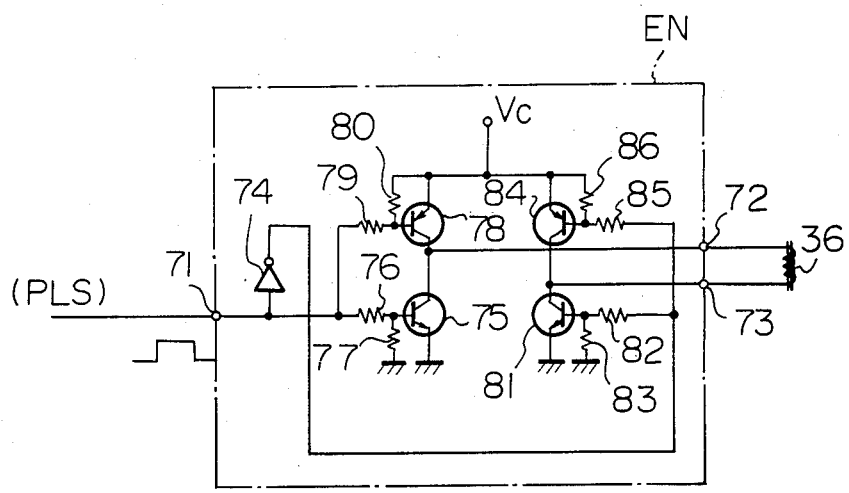
FIG. 6 is a circuit diagram of a coil excitation circuit in the device shown in FIG. 2.
Figure 9:
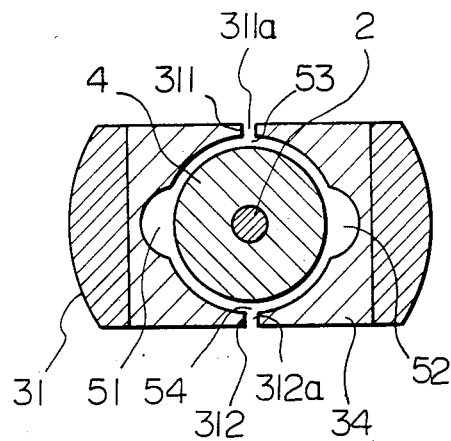
FIGS. 9 to 12 show various modifications of the structure shown in FIG. 3.

In this embodiment, the effective angle of rotation $\theta$ is within the range of 10° to 170°. Therefore, the valve rotor 17 must be set at the first position indicated by the solid line shown in FIG. 5 when the angle of rotation $\theta$ is 50°. Thus, the valve rotor 17 moves to the second position 17′ indicated by the broken line when the magnet rotates through 130°. In FIG. 6 is shown a circuit diagram of a coil excitation circuit EN where the current to be supplied to the coil 36 is changed according to the duty ratio DTY of the pulse signal applied thereto.

An input terminal 71 receives an ON/OFF duty pulse from the pulse generator PLS. The input terminal 71 is connected to the base of an NPN transistor 75 through a resistor 76 and to the base of PNP transistor 78 through a resistor 79. Output terminals 72 and 73 are connected to an electric input end of the rotary driving device, that is, to the lead wire 64 (see FIG. 2). The emitter of the transistor 75 is grounded. A resistor 77 is inserted between the base and emitter of the transistor 75. The collector of the transistor 75 is connected to the collector of the transistor 78.

The output terminal of an inverter 74 whose input terminal is connected to the input terminal 71 is connected to the base of an NPN transistor 81 through a resistor 82 and to the base of a PNP transistor 84 through a resistor 85. The emitters of the transistors 78 and 84 are commonly connected to receive a power supply voltage Vc. A resistor 80 is inserted between the base and emitter of the transistor 78. The juncture between the collectors of the transistors 75 and 78 is connected to the output terminal 72.

The emitter of the transistor 81 is grounded, and a resistor 83 is inserted between the base and emitter of the transistor 81. The collectors of the transistors 81 and 84 are commonly connected, and a juncture thereof is connected to the output terminal 73. A resistor 86 is inserted between the base and emitter of the transistor 84.

The mode of operation of the device shown in FIG. 2 will now be described. When a voltage of high level is applied to the input terminal 71 (see FIG. 6), the transistors 75 and 84 are turned on, and a current flows from the output terminal 73 of the coil excitation circuit EN to the output terminal 72. Accordingly, a positive current flows to the coil 36 of the rotary driving device. On the other hand, when a voltage of low level is applied to the input terminal 71, the transistors 78 and 81 are turned on, and a negative current flows to the coil 36.

The current may be regarded as a smoothed DC current which is obtained by changing the duty ratio DTY while keeping the frequency of the pulses, to be applied to the input end of the coil excitation circuit EN, at a constant frequency, which is determined in the light of the inertia moment of a mass including the rotary magnet and the valve rotor.

Figure 7:
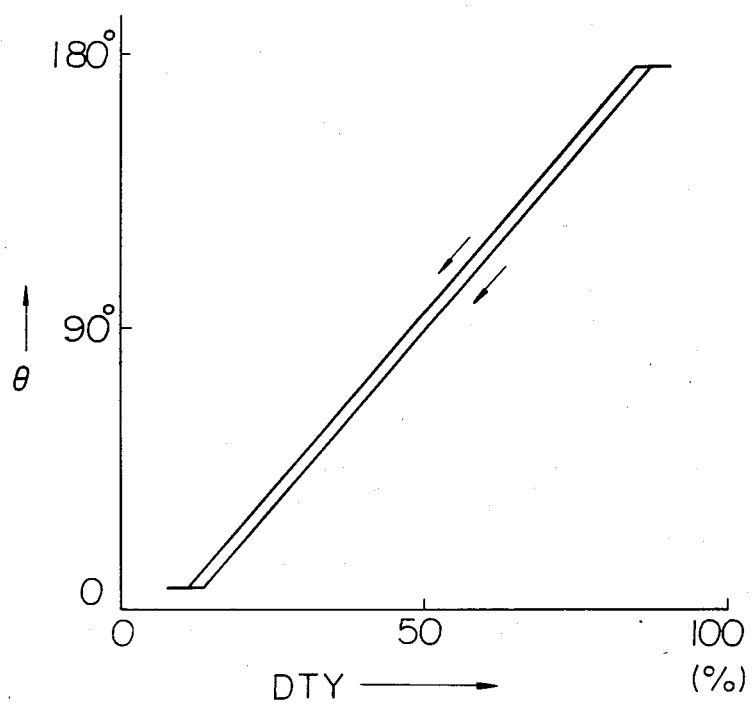
FIG. 7 is a graph of the relationship between the duty ratio of a signal pulse applied to the coil excitation circuit and the angle of rotation of the rotary magnet.

Accordingly, the angle of rotation is determined in accordance with the duty ratio DTY. In FIG. 7 is shown the angle of rotation $\theta$ of the rotary magnet 4 when the duty ratio DTY is changed, at a 75 Hz pulse frequency and 12 V power supply voltage Vc. A duty ratio DTY of 50% is obtained when the current is 0 in FIG. 8.

FIGS. 9 to 12 show modifications of the block 34. In a modification of FIG. 9, the block 34 is divided into two parts so that small slits 311a and 312a are formed at the width retricted portions 311 and 312. In a modification of FIG. 10, only one gap portion 52 is formed in the block 34.

Figure 11:
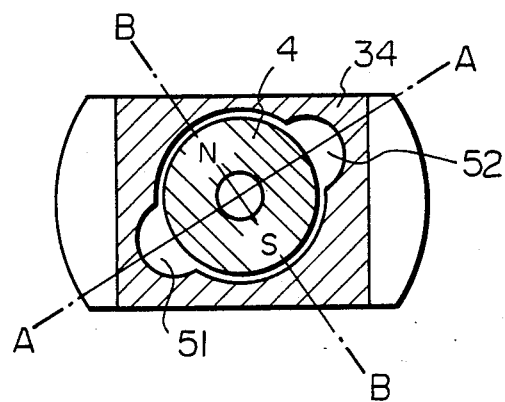

In a modification of FIG. 11, two gap portions 51 and 52 are so formed in the block 34 that an axis A—A including two gap portions 51 and 52 as well as a center of the shaft 2 is inclined with respect to the X—X axis. In the modification of FIG. 11, an angle of this inclination is 45° so that a stable position of the rotary magnet 4 is such a position where an axis B—B of its north and south poles is inclined by 45° with respect to the X—X axis.

Figure 12:
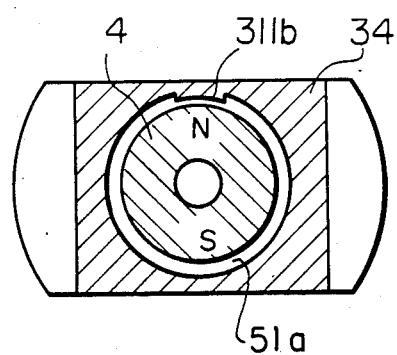
Figure 13:
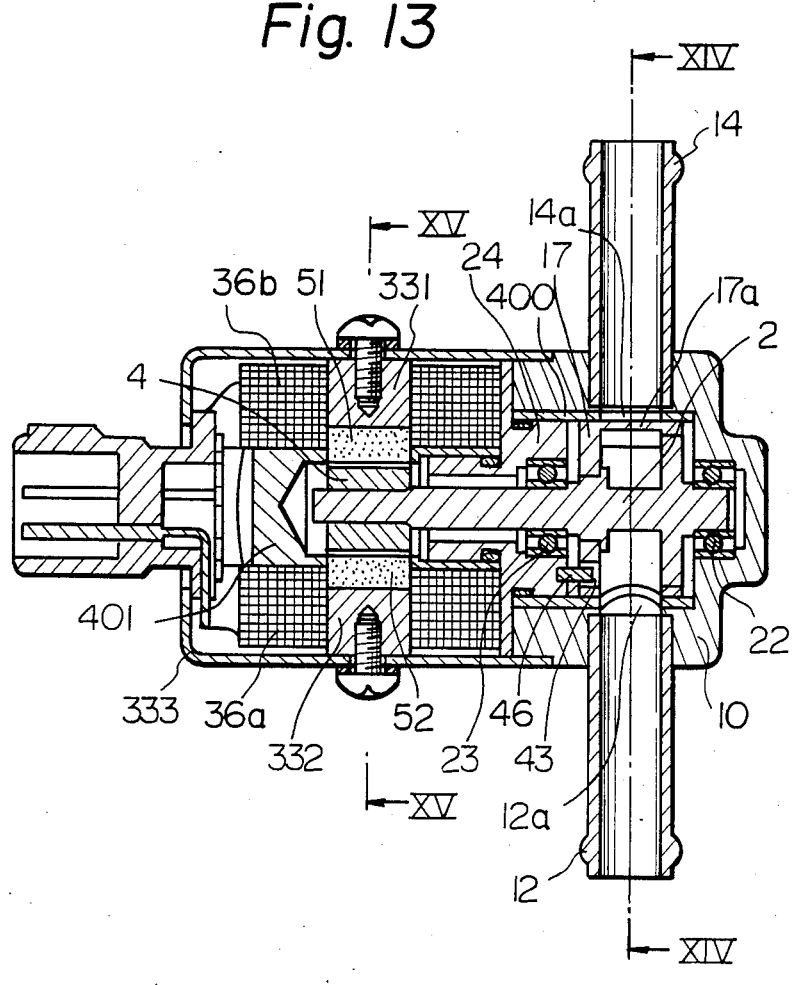
FIG. 13 is a longitudinal cross-sectional view of a rotary driving device according to another embodiment of the present invention.
Figure 14:
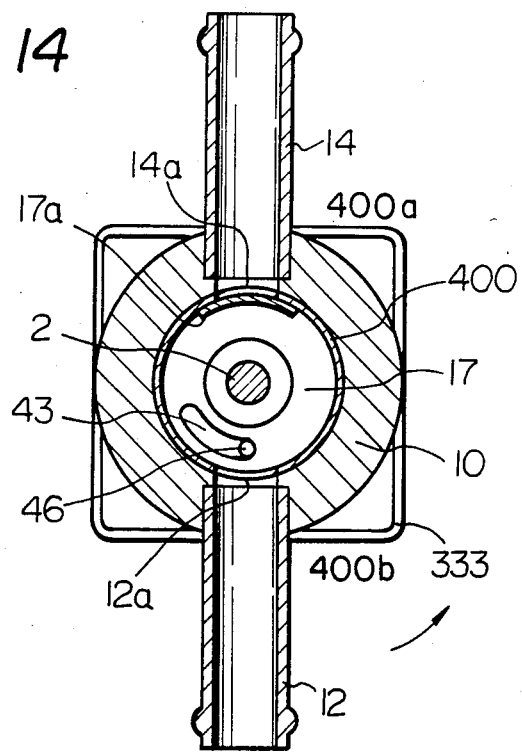
FIG. 14 is a sectional view taken along a line XIV—XIV in FIG. 13.
Figure 15:
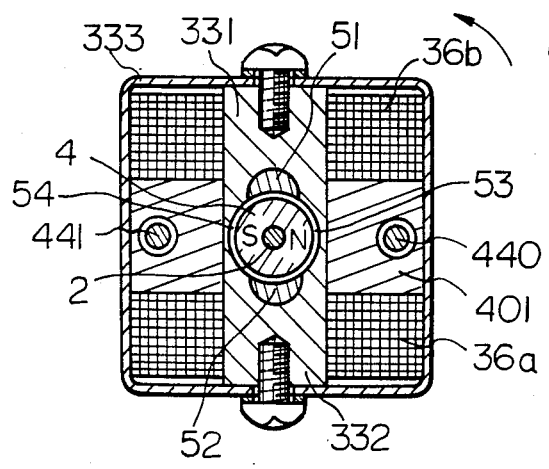
FIG. 15 is a sectional view taken along a line XV—XV in FIG. 13.
Figure 16:
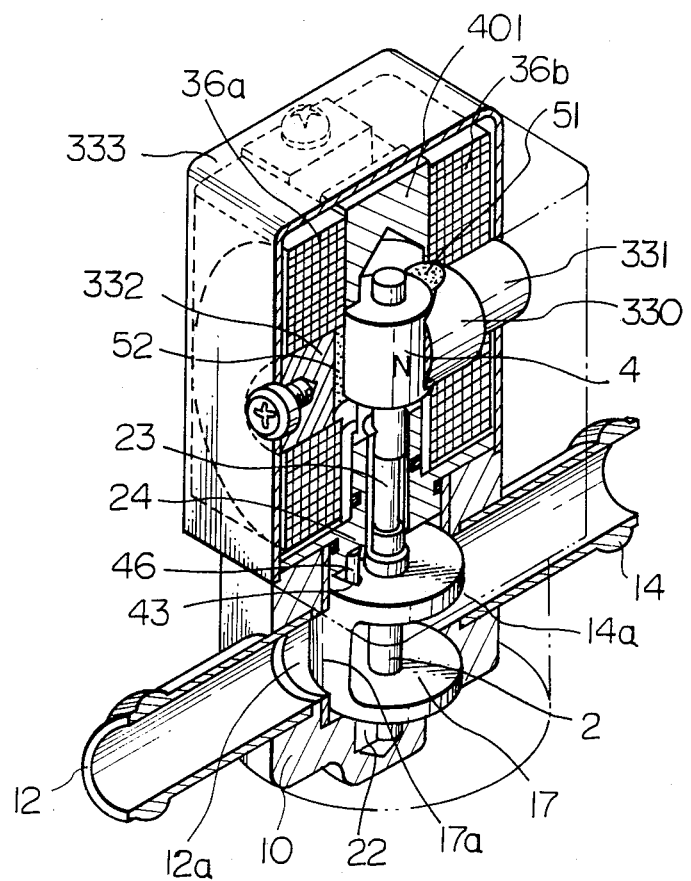
FIG. 16 is a perspective view of the device according to the embodiment of FIG. 13.

In a modification of FIG. 12, a C-shaped gap portion 51a is formed in the block 34 so that a small projection 311b faces the north or south pole of the rotary magnet 4, which is a stable position of the magnet in this modification.

FIGS. 13 to 16 show another embodiment of the present invention. A valve housing 10 is of a cup-shape and provided with inlet and outlet pipes 12 and 14. A cylindrical member 400 is press-inserted into a bore of the valve housing, so that the respective ports 400a and 400b (see FIG. 14) formed in the member 400 are aligned with the openings 12a and 14a formed in the valve housing 10 into which the pipes 12 and 14 are fitted.

A valve rotor 17 is rotatably disposed in the cylindrical member 400 and a valve shaft 2 firmly fixed to the rotor 17 is supported by a bearing 22 at its one end and at its other end by a bearing 23 attached to a valve cover 24. The valve rotor 17 has two annular plates 17b and 17c (see FIG. 16) and an arcuate portion 17a formed between two plates 17b and 17c, wherein the arcuate portion 17a is slidably rotated in the inner circular surface of the cylindrical member 400 and opens and closes either the inlet port 400a or the outlet port 400b.

An arcuate slot 43 is formed in the annular plate 17b. A stopper pin 46, fixed to the valve cover 24 at one end, is inserted into the arcuate slot 43 so that a rotational angle of the valve rotor 17 is restricted. The rotary shaft 2 extends through the valve cover 24 and a magnet 4 is attached to its forward end.

A casing 333 made from a magnetic material is attached to the valve housing 10. A support member 401 made from a non-magnetic material such as aluminum is disposed in the casing 333 and is provided with two through-holes. Two screws 440 and 441 (see FIG. 15) are inserted into these holes and screwed into the valve housing 10, so that the valve housing 10, the casing 333 and the support member 401 are firmly coupled with each other.

A core member 331 is extended through and at right angle to the support member 401 and is fixed to the casing 333 by means of screws. A hollow bore is formed in the core member 311, in which the rotary magnet 4 is rotatably disposed. Magnetic gap portions 51 and 52 are formed in the core member 331 as in the first embodiment, and these gap portions are filled with a nonmagnetic material such as aluminum. Coils 36a and 36b connected in series with each other are would on the core member 331. The operation of the second embodiment of FIG. 13, described above, is the same as that of the embodiment of FIG. 2.

Figure 17:
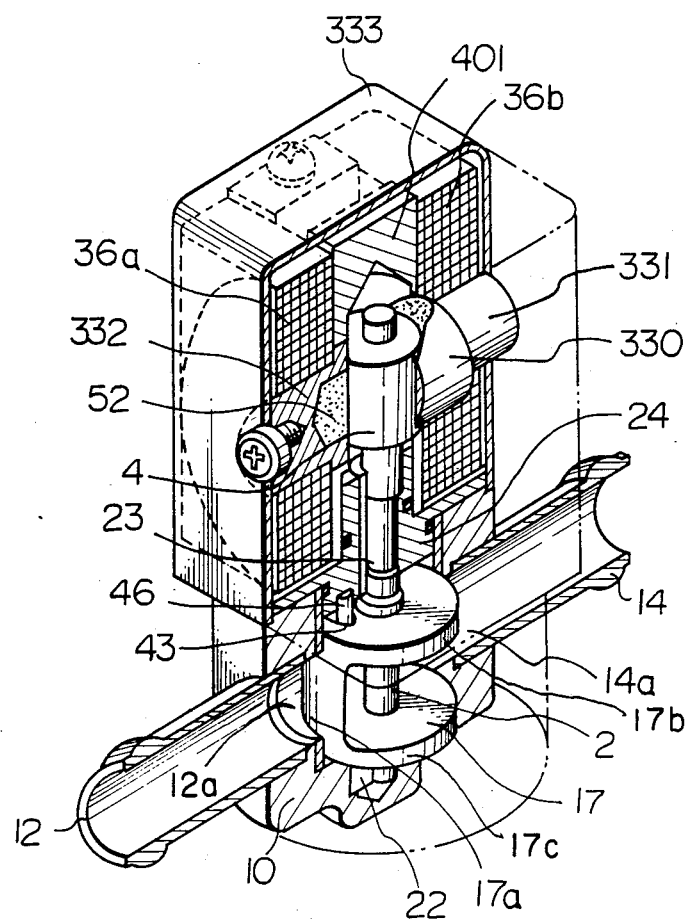
FIG. 17 is a perspective view showing a modification of the embodiment of FIG. 13.

FIG. 17 shows a further embodiment, wherein magnetic gap portions 51 and 52 (portion 51 is not shown) are formed in the core member 331 in such a manner that the gap potions extend in a longitudinal direction of the core member 331. The gap portions 51 and 52 may also be filled with a nonmagnetic material.

Although the present invention has been described with reference to preferred embodiments, it will be understood that the present invention is not limited to such embodiments. Various changes and modifications may be made within the scope of the present invention. For example, in the embodiment of FIG. 2, described above, the gap portions in the block 34 which are on the X-axis are of a semicircle shape. However, the through hole of the block 34 may be formed elliptically such that its major axis extends along the X-axis and its minor axis extends along the Y-axis. The electromagnetic coil can be supplied with a DC current only in one direction, wherein the amount of the current is varied so as to vary the magnitude of the magnetic flux generated thereat.

We claim:

1. An electromagnetic rotary driving device comprising:
    a support member made of non-magnetic material and having planar portions at both sides, respectively;
    a core member formed in a bar shape, a center line of an axis of said core member penetrating in a direction perpendicular to said planar portions, each end portion of said core member projecting in a direction perpendicular to each of said planar portions;
    a pair of coils each of which is wound around each end portion of said core member, each one surface of said pair of coils being arranged adjacent to each of said planar portions;

a current supply means by which a current, the magnitude of which is variably controlled, is supplied to said pair of coils so as to pass a magnetic flux in the direction of the length of the axis of said core member;

a casing made of magnetic material and encasing said pair of coils, said core member, and said support member, said casing being provided with an opening at one end portion thereof, a hollow bore formed in said support member and said core member, respectively, so as to penetrate through a center portion of said core member and a center portion of said support member extending from said opening of said casing, a center line of an axis of said hollow bore being perpendicular to the center line of the axis of said core member;

a permanent magnet formed in a cylindrical shape and rotatably disposed in said hollow bore penetrated through said core member, the circumference of said permanent magnet being opposite to an inner wall of said hollow bore with predetermined gaps, each of N and S magnetic poles being provided on the opposite side of said circumference of said permanent magnet, said gaps comprising a pair of large gap portions and a pair of small gap portions, each of said pair of large gap portions being provided so as to envelope a part of the circumference of said permanent magnet at each of both side positions existing in the direction along the axis of said core member, each of said pair of small gap portions being provided so as to connect said large gap portions to each other and envelope the remainder of the circumference of said permanent magnet, a pair of width restricted portions having only a narrow path for said magnetic flux being formed between said pair of small gap portions and an outer surface of said core member;

a cover portion covering said opening of said casing, in which cover portion a bearing portion is provided;

a rotary shaft fixed to said permanent magnet and pivoted through said bearing portion so as to be able to rotate with said permanent magnet, one end portion of said rotary shaft projecting from said cover portion to the outside of said casing; and a stopper portion provided between said rotary shaft and said cover portion, which stopper portion limits the angle of the rotation of said permanent magnet and said rotary shaft within the range of at most 180°, so that said magnetic poles provided on the circumference of said permanent magnet do not pass rotationally beyond the position corresponding to said large gap portions.

2. An electromagnetic rotary driving device as claimed in claim 1, said current supply means comprising a means for supplying a pulse signal to said coils, the ratio between the period of high and low levels of said pulse signal being selectable, the amount of the magnetic flux generated by said coils being varied depending on a duty cycle of said pulse signal.

3. An electromagnetic rotary driving device as claimed in claim 2, said current supply means further comprising a current control means for controlling the direction of flow of current flowing through said coils in response to said high and low levels of said pulse signal, the magnitude of the magnetic flux generated by said coils being varied depending on a duty cycle of said pulse signal.

4. An electromagnetic rotary driving device as claimed in claim 1, wherein
said pair of large gap portions is filled with solid nonmagnetic material.

5. An electromagnetic rotary driving device as claimed in claim 1, said stopper portion comprising:
a plate fixed to said rotary shaft;
an arcuate slot formed in said plate; and
a stopper pin connected to a stationary portion portion, one end of said stopper pin being engaged with said slot for restricting a rotational angle of said rotary shaft.

6. An electromagnetic rotary driving device according to claim 1, wherein said stopper portion is arranged at the output portion of said rotary shaft projecting from said cover portion to the outside of said casing and is provided with a plate rotating with said rotary shaft in which plate an arcuated slot is formed and a stopper pin having one end portion and the other end portion each of which end portions is received in said arcuated slot and is fixed to said cover portion, respectively.

7. An electromagnetic rotary driving device according to claim 6, further comprising a valve housing in which an inlet pipe, an outlet pipe, and a valve rotor are provided, wherein said valve rotor is rotatably disposed in said valve housing by connecting said valve rotor to said rotary shaft, said valve rotor and said plate being constructed in an incorporated structure.

* * * * *